United States Patent [19]

Landry

[11] Patent Number: 5,580,324
[45] Date of Patent: Dec. 3, 1996

[54] DRIVEN PULLEY WITH A CLUTCH

[75] Inventor: Jean-Bernard Landry, Drummondville, Canada

[73] Assignee: Powerbloc IBC Canada Inc., Canada

[21] Appl. No.: 463,492

[22] Filed: Jun. 5, 1995

[51] Int. Cl.⁶ ................................................. F16H 59/00
[52] U.S. Cl. ................................................................ 474/19
[58] Field of Search ........................... 474/8, 10, 17, 474/19, 21, 46; 192/34, 48.7, 48.92, 52.2, 52.4, 54.5, 55.5, 55.62, 66.22, 89.21

[56] References Cited

U.S. PATENT DOCUMENTS

| | | | |
|---|---|---|---|
| 3,289,496 | 12/1966 | Hoover | 474/15 X |
| 3,504,560 | 4/1970 | Wunsch | 474/17 X |
| 3,534,622 | 10/1970 | Johnson | 474/19 X |
| 3,628,389 | 12/1971 | Wiegelmann et al. | 474/19 |
| 3,967,509 | 7/1976 | Teal | 474/19 |
| 4,033,195 | 7/1977 | Takagi et al. | 474/19 |
| 4,403,976 | 9/1983 | Takagi | 474/19 |
| 4,427,402 | 1/1984 | Steinhofer | 474/46 X |
| 4,673,379 | 6/1987 | Ohzono et al. | 474/28 |

FOREIGN PATENT DOCUMENTS

| | | |
|---|---|---|
| 0222929 | 5/1987 | European Pat. Off. . |
| 1292778 | 10/1962 | France . |
| 1536960 | 7/1968 | France . |
| 2356852 | 6/1977 | France . |
| 2658892 | 2/1990 | France . |

*Primary Examiner*—Roger J. Schoeppel
*Attorney, Agent, or Firm*—Merchant, Gould, Smith, Edell, Welter and Schmidt

[57] ABSTRACT

The driven pulley is used in a variable-speed belt drive. It includes a clutch for transferring torque from the belt to the main shaft of the driven pulley. The clutch is alternatively movable between a disengaged position where the belt can still be in movement without transferring torque, and an engaged position where the torque is transferred to the main shaft. The clutch is controlled by the winding diameter of the belt. A plurality of rods is also provided for keeping the flanges from rotating relative to each other and for transferring torque from the flanges to a movable plate at the back of the clutch. This driven pulley reduces the wear of the belt, decreases the response time and increases the maximum torque that can be transferred compared with the conventional driven pulleys.

8 Claims, 2 Drawing Sheets

DRIVEN PULLEY WITH A CLUTCH

FIELD OF THE INVENTION

The present invention relates to a driven pulley used in a variable-speed drive adapted to receive a trapezoidal belt by which power is transmitted from a driving pulley to the driven pulley.

BACKGROUND OF THE INVENTION

Trapezoidal belt variable-speed drives are commonly used on small vehicles such as snowmobiles, scooters or small cars. Such drives mainly comprise a driving pulley, a trapezoidal belt and a driven pulley. The driving pulley is linked to an engine and the driven pulley is usually mechanically connected to ground traction means, such as wheels or tracks.

The main object of using a variable-speed drive is to automatically change the winding diameter of the trapezoidal belt around the driving and the driven pulleys in order to have a maximum torque at low speeds and a reasonable engine rotation speed at high speeds. The sides of the trapezoidal belt are, on each pulley, gripped between two opposite flanges wherein one is fixed and one is axially movable. At low speeds, the winding diameter of the driving pulley is small and the winding diameter of the driven pulley is maximum. As the rotation speed of the driving pulley increases, the movable flange of the driving pulley gets closer to the fixed flange and thus forces the trapezoidal belt to wind on a greater diameter. Since the trapezoidal belt is not substantially stretchable, the trapezoidal belt exerts a radial force towards the center on the flanges of the driven pulley in addition to the tangential driving force to compensate for the increasing winding diameter of the driving pulley. This radial force constrains the driven pulley to have a smaller winding diameter. Therefore, the movable flange of the driven pulley moves away from the fixed flange until the return force exerted by a spring counterbalances the radial force exerted by the trapezoidal belt. It should be noted at this point that a change in the load also produces a variation of the winding diameter of the pulleys, a greater load inducing a greater winding diameter of the driven pulley.

When the rotation speed of the engine decreases, the winding diameter of the driving pulley decreases and the radial force exerted by the trapezoidal belt decreases, thus allowing the driven pulley to have a greater winding diameter.

In conventional driven pulleys, the movable flange is provided with a plurality of slider buttons at the back thereof. These buttons have inclined surfaces that are adapted to be set against a cam plate solid with the shaft. The cam plate has inclined surfaces at equal distance around the shaft. The inclined surfaces allow the movable flange to move away or towards the fixed flange while still keeping a rotational engagement with the cam plate, therefore with the shaft. In such driven pulleys, the fixed flange is solid with the shaft. Then, as a result, there is a relative rotation of the movable flange with reference to the fixed flange as it moves away or towards it. One of the drawbacks of such relative movement between flanges is that one side of the belt has to "slip" on the movable flange until a new equilibrium is reached in the driven pulley while the other side of the belt remains substantially in full contact. Wear is thus likely to happen on one side of the belt. Additionally, the slip increases the response time and reduces the maximum torque that can be transferred through the driven pulley.

Another drawback of conventional driven pulleys is that the belt used in a conventional drive is also used as a clutch lining for positively engaging the drive into action when accelerating from full stop or from a very low speed. This is done by the driving pulley where the flanges are not initially engaged with the belt and where an engagement occurs as the movable flange moves towards the fixed flange due to an increase in the motor speed. The condition of the belt is likely to deteriorate after a number of starts because of the high friction, especially if the load is very high or if the start is very sudden. Although the materials used for making belts are more resistant than in the past, the belts are still not suitable as clutch linings.

SUMMARY OF THE INVENTION

It is an object of the present invention to resolve the above-mentioned drawbacks by providing a driven pulley with a built-in clutch and where both flanges do not rotate relative to each other.

More particularly, it is a object of the present invention to provide a driven pulley for a variable-speed belt drive, the pulley comprising:

a shaft;

a cam plate coaxially mounted on the shaft and solid therewith, the cam plate having one side provided with a plurality of inclined cam surfaces;

a conical drum coaxially mounted on the shaft and free in rotation and translation therewith, the drum having one side, facing the cam surfaces, provided with a plurality of slider buttons, each in contact with a respective cam surface;

a drum biasing means for urging the drum away from the cam plate;

a stop means for keeping the drum within a maximum distance from the cam plate;

a first conical flange coaxially mounted on the cam plate and free in rotation therewith;

a second conical flange facing the first flange and coaxially mounted on the cam plate, the second flange being free in translation and rotation with the cam plate, the second flange defining with the first flange a V-shaped groove for receiving a trapezoidal belt;

a means for preventing the first and the second flange from rotating relative to each other; and a clutch means for transferring torque to the drum as the clutch is in an engaged position when the belt is closer to the shaft than a threshold winding diameter, the clutch being in a disengaged position when the belt is farther to the shaft than the threshold winding diameter.

A non restrictive description of a preferred embodiment will now be given with reference to the appended drawings.

DESCRIPTION OF A PREFERRED EMBODIMENT

Figure 1:
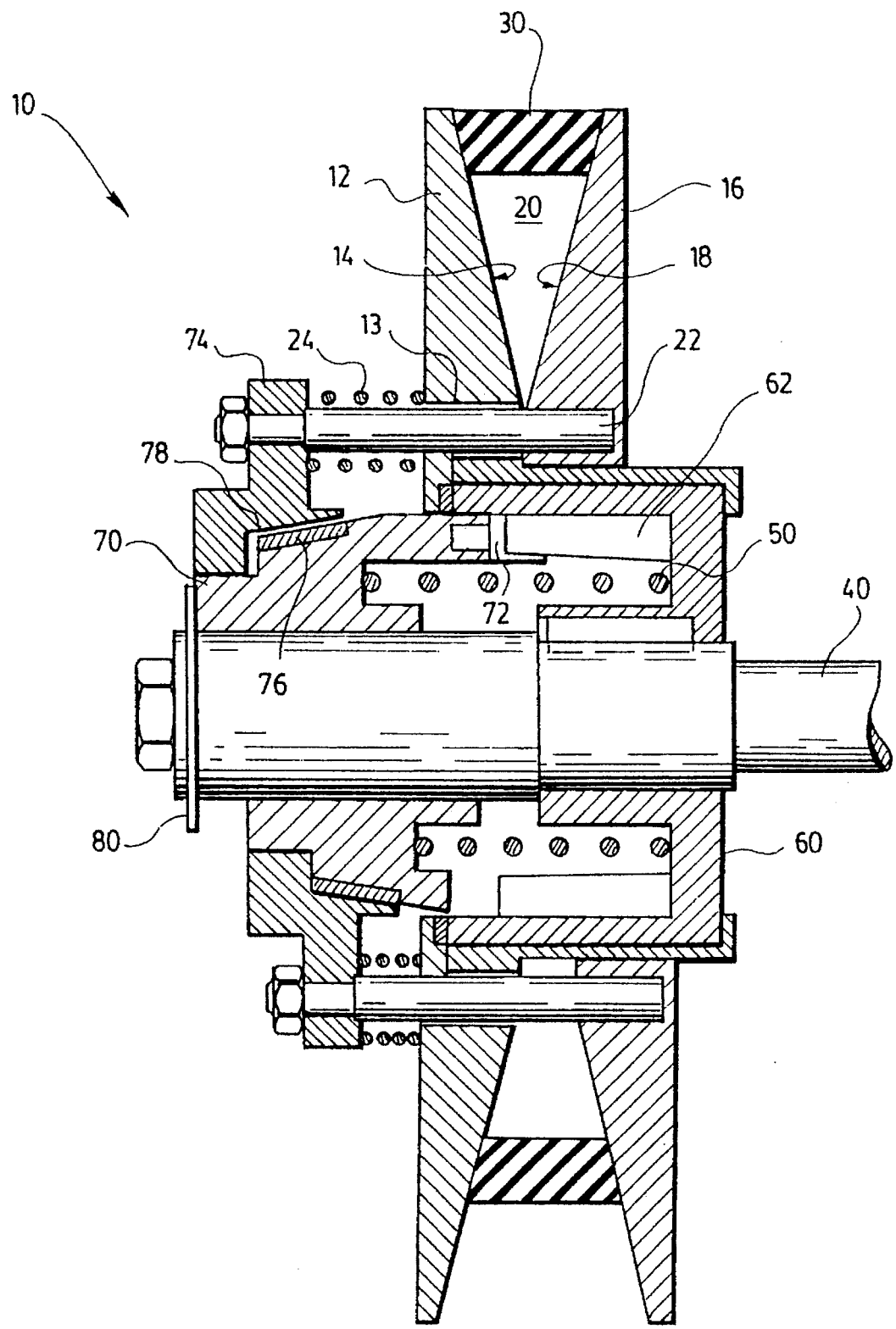
FIG. 1 is a cross sectional view of the driven pulley according to the invention, with the upper half in a low rotation speed position and the lower half in a high rotation speed position.
Figure 2:
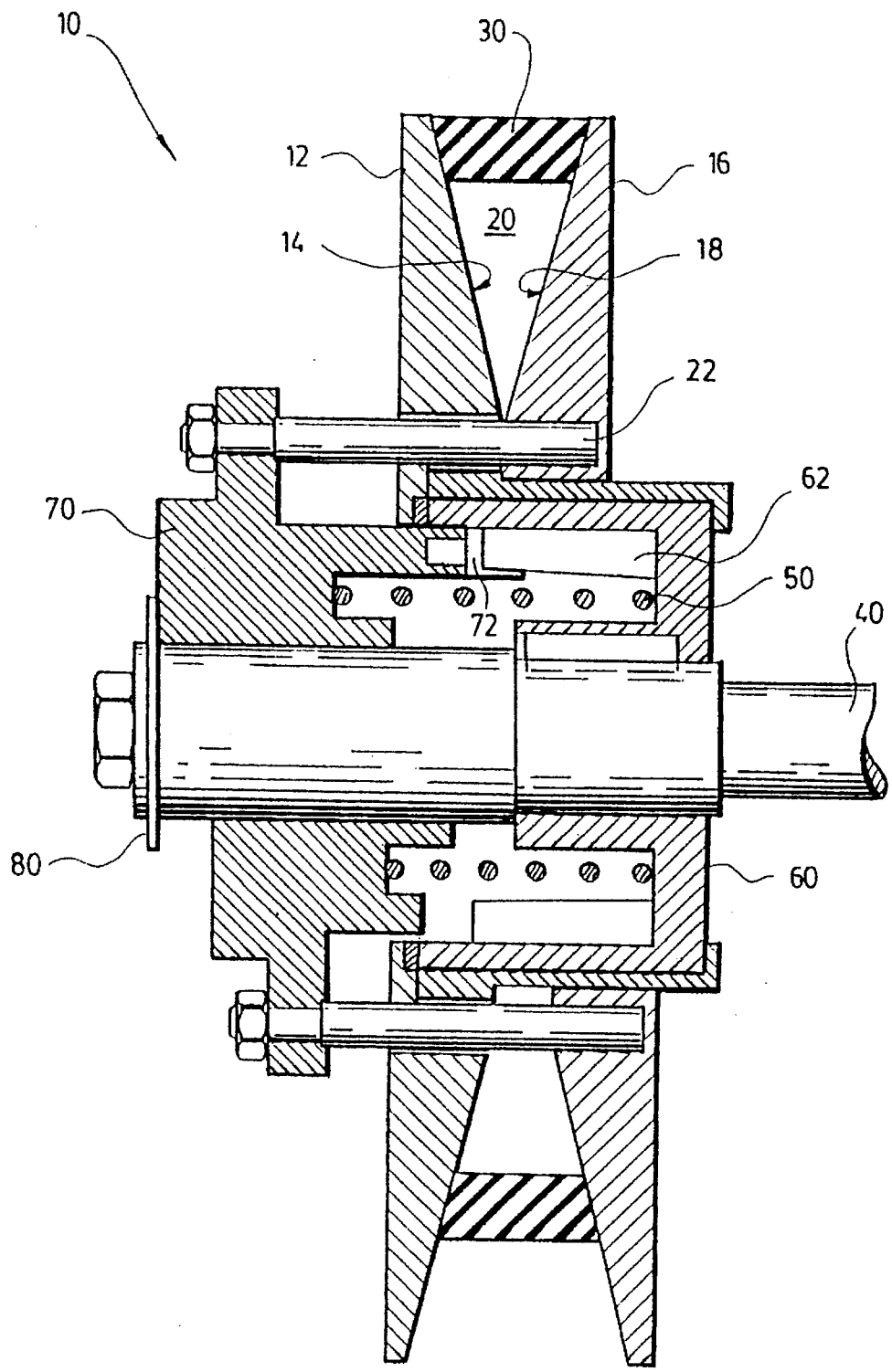
FIG. 2 is a view similar to FIG. 1, showing the driven pulley without a clutch.

With reference to the accompanying drawings, the driven pulley comprises the following numbers:

- 10: driven pulley
- 12: first flange
- 13: apertures
- 14: inner conical wall (first flange)
- 16: second flange
- 18: inner conical wall (second flange)
- 20: V-shaped groove
- 22: rods
- 24: clutch springs
- 30: trapezoidal belt
- 40: shaft
- 50: drum spring
- 60: cam plate
- 62: cam surfaces
- 70: conical drum
- 72: slider buttons
- 74: movable plate
- 76: first friction lining
- 78: second friction lining
- 80: circlip As shown in FIGS. 1 and 2, the driven pulley (10) comprises two conical flanges (12) and (16) coaxially mounted on a main central shaft (40). Each of the flanges (12) and (16) has a inner conical wall, respectively designated (14) and (18), provided in a face-to-face relationship with the other for defining a V-shaped groove (20) receiving a trapezoidal belt (30) winded substantially around half of the driven pulley (10).

On the shaft (40) is mounted a cam plate (60) similar to the ones found in conventional driven pulleys. The cam plate (60) is coaxially mounted on the shaft (40) with which it is solid, meaning that no relative movement between each other can occur. The cam plate (60) bears inclined cam surfaces (62) extending around the shaft (40) at a given radius. The cam surfaces (62) are inclined with reference to the bottom of the cam plate (60).

The cam plate (60) also bears the first and second flanges (12,16), both coaxially mounted on its outer periphery. The first flange (12) is free in rotation with the cam plate (60), meaning that it can rotate relative to the cam plate (60) but not move axially. In the illustrated embodiment, the central portion of the first flange (12) extends all over the periphery of the cam plate (60) in order to prevent the relative translation. The second flange (16) is free both in translation and in rotation with the cam plate (60). In the illustrated embodiment, the second flange (16) is also mounted around the central portion of the first flange (12) since the central portion extends all over the periphery of the cam plate (60). Preferably, appropriate bushings are used at various locations for allowing easy relative movements between the parts, as it is apparent for a person skilled in the art.

A conical drum (70) is coaxially mounted on the shaft (40) but it is free in rotation and in translation therewith. The side of the drum (70) that faces the cam surfaces (62) is provided with a plurality of slider buttons (72), each in contact with a respective cam surface (62). The purpose of the slider buttons (72) is to allow constant positive contact of the drum (70) with the cam plate (60). The cam surfaces (62) are inclined opposite the direction of rotation of the driven pulley (10) so that the torque can be transmitted between the parts.

Since the drum (70) is away from the cam plate (60) when the engine is idling, a biasing means, such as the drum spring (50), is provided for urging the drum (70) away from the cam plate (60). In FIG. 1, the spring (50) is a helicoidal spring set directly between the cam plate (60) and the drum (70). Other kinds of biasing means may of course be suitable as apparent for a person skilled in the art.

A stop means is provided for keeping the drum within a maximum distance. This stop means may have various forms. For instance, it can be a circlip (80).

One of the features of the present invention is that a clutch is provided for transferring torque from the belt (30) to the drum (70) whenever needed. The drum (70) will transfer this torque to the cam plate (70) which is connected to the shaft (40). The clutch has two main positions, or states, and an intermediary position when the clutch is between the main positions. When the belt (30) is closer to the shaft (40) than a threshold winding diameter, the clutch is in the engaged position. When the belt (30) is farther to the shaft (40), then the clutch is in the disengaged position. These positions, as well as the intermediary position, are described further hereinafter.

FIG. 1 illustrates one embodiment of a clutch well adapted for use on the driven pulley (10). It has two main elements. The first is a movable plate (74) coaxially mounted on the drum (70) and initially free in translation and rotation therewith. The movable plate (74) has a first contact surface facing a corresponding second contact surface provided on the drum (70). Preferably, the first contact surface comprises a first friction lining (76) facing a second friction lining (78) provided on the second contact surface. The second element is a means for adjoining the first and the second contact surface when the clutch is in the engaged position in order to prevent relative movement between the movable plate (74) and the drum (70). These linings (76,78) are either continuous or provided in patches. Their purpose is to withstand the friction occurring when the rotating movable plate (74) meets the then static drum (70). The friction will generate heat during the time the drum (70), as well as the other parts mechanically connected downstream, accelerate in rotation to reach the rotation speed of the movable plate (74).

Preferably, the means for adjoining the first and second contact surface comprises a plurality of rods (22) symmetrically disposed around the shaft (40) and parallel therewith, as shown in FIG. 1. Each rod (22) has a first end rigidly connected to the movable plate (74) and a second end rigidly connected to the second flange (16). Each rod (22) extends through the first flange (12) by means of a corresponding aperture (13) allowing only relative sliding movement between the rod (22) and the first flange (12). One advantage of the rods (22) is that they also define the means for preventing the first and second flange from rotating relative to each other. The means for adjoining the first and second contact surface also comprises a clutch biasing means, such as the springs (24), for urging the movable plate (74) away from the first flange (12), thus urging the second flange (16) closer to the first flange (12). The springs (24) are preferably helicoidal and each coaxially mounted around a corresponding rod (22) between the movable plate (74) and the first flange (12).

In order to show the differences between the disengaged and the engaged position of the driven pulley (10), FIG. 1 illustrates the upper half of the driven pulley (10) in the disengaged position and the lower half in the engaged position. There is also the intermediary position as explained hereinafter.

Disengaged Position

The disengaged position is shown in the upper half of FIG. 1. The driven pulley (10) is said to be in the disengaged position when there is no transfer of torque between the engine and the shaft (40). This occurs for example when the engine is idling. Because the clutch of the driven pulley (10) has a disengaged position, it is possible to provide the drive with a driving pulley where the belt (30) is constantly driven by it, even if the engine is idling. The belt (30) is then at a minimum winding diameter on the driving pulley and at a maximum winding diameter on the driven pulley (10).

At that point, there are two categories of elements in the driven pulley (10): the ones that are not in rotation and the ones that are driven into rotation because of the movement of the belt (30).

Elements not in rotation:
a) the shaft (40);
b) the cam plate (60);
c) the drum spring (50);
d) the drum (70).

Elements in rotation:
a) the first flange (12);
b) the second flange (16);
c) the rods (22);
d) the movable plate springs (24);
e) the movable plate (74).

Intermediary Position

The intermediary position is not shown in FIG. 1. The driven pulley (10) is said to be in the intermediary position when the movable plate (74) is about to engage or disengage with the drum (70).

As the rotation speed of the engine increases, the winding diameter of the driving pulley increases. As a result, the belt (30) must have a smaller winding diameter on the driven pulley (10) in compensation. To do so, it applies on the inner conical walls (14,16) a radial force towards the shaft (40) which forces the second flange (16) to move away from the first flange (12). Since the second flange (16) is connected to the movable plate (74) by the rods (22), the movable plate (74) is brought closer to the drum (70) until their respective contact surfaces are adjoined as the belt (30) reaches a given winding diameter.

On the opposite, when the engine speed decreases to idle, the driving pulley sets the belt (30) to the smallest winding diameter, thereby allowing the winding diameter of the driven pulley (10) to reach its maximum winding diameter. While the radial force applied by the belt (30) on the inner conical walls (14,18) decreases, the drum spring (50) and the movable plate springs (78) force the second flange (16) to move closer to the first flange (12). When the belt (30) reaches the threshold winding diameter, the contact surfaces of the drum (70) and of the movable plate (74) detach from each other, thereby going back to the disengaged position.

Engaged Position

The driven pulley (10) is said to be in the engaged position when the drum (70) and the movable plate (74) are in full contact. The output torque of the engine is streaming to the driving pulley, to the belt (30), to the flanges (12,16), to the rods (22), to the movable plate (74), to the drum (70), to the slider buttons (72), to the cam surfaces (62), to the cam plate (60), and then to the shaft (40). From the shaft (40), the torque is transmitted to elements (not shown) such as gears, wheels, tracks, etc.

When the vehicle is decelerating, the torque can also be transmitted backwards in order to benefit from the braking capabilities of the engine.

Operation of the Driven Pulley

As aforesaid, the trapezoidal belt (30) is winded around the driven pulley (10) for transmitting torque coming from the driving pulley (not shown). The presence of a gripping force between the belt (30) and the conical walls (14,18) allows the force in the belt (30) to be transformed into a torque for bringing the driven pulley (10) into rotation. The driven pulley (10) is mechanically connected to the mechanisms to be driven (not shown), such as the wheels, tracks. When the clutch gets to the engaged position, the whole driven pulley (10) is driven into rotation. Then, as the belt (30) gains speed, the driving pulley increases its winding diameter, thereby forcing the diameter of the present driven pulley to lower its winding diameter. The belt (30) will thus move closer to the shaft (40). The only way that the belt (30) may move axially towards the shaft (40) is by pushing the second flange (16) away from the first flange (12). When it moves axially, the second flange (16) cannot bring the movable plate (74) nor the drum (70) closer to it. The only degrees of freedom available are given by the inclined cam surfaces (62) of the cam plate (60). The drum (70) is forced to rotate relative to the shaft (40) while its slider buttons (72) are still in contact with the cam surfaces (62). The slider buttons (72) will "climb" the cam surfaces (62), inducing in the same time a relative axial movement of the drum (70). Since the movable plate (74), the rods (22) and the flanges (12,16) are all connected to each other in the engaged position, they too will rotate and move axially relative to the shaft (40). These relative movements will stop when an equilibrium is reached between the axial component of the force applied by the slider buttons (72) on the cam surfaces (62) and the sum of the return forces of the springs (24,50). This process will resume as soon as the conditions change and force the driven pulley (10) to find a new equilibrium.

When the engine speed resumes to idle speed, the clutch of the driven pulley (10) returns to the disengaged position as the winding diameter of the belt (30) becomes greater than the threshold winding diameter.

One can appreciate that the present invention prevents the first and the second flange from rotating relative to each other.

FIG. 2 shows an embodiment where no clutch is used.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What I claim is:

1. A driven pulley for a variable-speed belt drive, the pulley comprising:
   a shaft;
   a cam plate coaxially mounted on the shaft and solid therewith, the cam plate having one side provided with a plurality of inclined cam surfaces;

a conical drum coaxially mounted on the shaft and free in rotation and translation therewith, the drum having one side, facing the cam surfaces, provided with a plurality of slider buttons, each in contact with a respective cam surface;

a drum biasing means for urging the drum away from the cam plate;

a stop means for keeping the drum within a maximum distance from the cam plate;

a first conical flange coaxially mounted on the cam plate and free in rotation therewith;

a second conical flange facing the first flange and coaxially mounted on the cam plate, the second flange being free in translation and rotation with the cam plate, the second flange defining with the first flange a V-shaped groove for receiving a trapezoidal belt;

a means for preventing the first and the second flange from rotating relative to each other; and a clutch means for transferring torque to the drum as the clutch means is in an engaged position when the belt is closer to the shaft than a threshold winding diameter, the clutch means being in a disengaged position when the belt is farther from the shaft than the threshold winding diameter.

2. A driven pulley according to claim 1, wherein the clutch means comprises:

a movable plate coaxially mounted on the drum and free in translation and rotation therewith when the clutch means is in the disengaged position, the movable plate having a first contact surface facing a corresponding second contact surface provided on the drum; and a means for adjoining the first and the second contact surface when the clutch means is in the engaged position in order to prevent relative movement between the movable plate and the drum.

3. The driven pulley according to claim 2, wherein the means for adjoining the first and second contact surface comprises:

a plurality of rods symmetrically disposed around the shaft and parallel therewith, each rod having a first end rigidly connected to the movable plate and a second end rigidly connected to the second flange, each rod extending through the first flange by means of a corresponding aperture allowing only relative sliding movement between the rod and the first flange; and a clutch biasing means for urging the movable plate away from the first flange.

4. The driven pulley according to claim 3, wherein the clutch biasing means comprises a plurality of helicoidal springs, each coaxially mounted around a corresponding rod between the movable plate and the first flange.

5. The driven pulley according to claim 2, wherein the first contact surface comprises a first friction lining facing a second friction lining provided on the second contact surface.

6. The driven pulley according to claim 1, wherein the drum biasing means comprises a helicoidal spring coaxially mounted around the shaft between the drum and the cam plate.

7. The driven pulley according to claim 1, wherein the stop means comprises a circlip.

8. A driven pulley for a variable-speed belt drive, the pulley comprising:

a shaft;

a cam plate coaxially mounted on the shaft and solid therewith, the cam plate having one side provided with a plurality of inclined cam surfaces;

a conical drum coaxially mounted on the shaft and free in rotation and translation therewith, the drum having one side, facing the cam surfaces, provided with a plurality of slider buttons, each in contact with a respective cam surface;

a helicoidal spring coaxially mounted around the shaft between the drum and the cam plate for urging the drum away from the cam plate;

a circlip for keeping the drum within a maximum distance from the cam plate;

a first conical flange coaxially mounted on the cam plate and free in rotation therewith;

a second conical flange facing the first flange and coaxially mounted on the cam plate, the second flange being free in translation and rotation with the cam plate, the second flange defining with the first flange a V-shaped groove for receiving a trapezoidal belt; and a clutch means for transferring torque to the drum as the clutch means is in an engaged position when the belt is closer to the shaft than a threshold winding diameter, the clutch means being in a disengaged position when the belt is farther from the shaft than the threshold winding diameter, the clutch means comprising:

a movable plate coaxially mounted on the drum and free in translation and rotation therewith when the clutch means is in the disengaged position, the movable plate having a first contact surface facing a corresponding second contact surface provided on the drum, the first contact surface comprising a first friction lining facing a second friction lining provided on the second contact surface;

a plurality of rods symmetrically disposed around the shaft and parallel therewith, each rod having a first end rigidly connected to the movable plate and a second end rigidly connected to the second flange, each rod extending through the first flange by means of a corresponding aperture allowing only relative sliding movement between the rod and the first flange, the rods adjoining the first and the second contact surface when the clutch means is in the engaged position in order to prevent relative movement between the movable plate and the drum; and a plurality of helicoidal springs, each coaxially mounted around a corresponding rod between the movable plate and the first flange for urging the movable plate away from the first flange.

* * * * *